United States Patent [19]

Walker et al.

[11] 4,124,671

[45] Nov. 7, 1978

[54] METHOD FOR STRENGTHENING PZT TRANSDUCERS

[75] Inventors: Basil E. Walker, Oxon Hill, Md.; Robert C. Pohanka, Springfield; Roy W. Rice, Alexandria, both of Va.

[73] Assignee: The United States of America as represented by the Secretary of the Navy, Washington, D.C.

[21] Appl. No.: 635,020

[22] Filed: Nov. 25, 1975

[51] Int. Cl.² .............................................. C04B 35/26
[52] U.S. Cl. .................................. 264/85; 252/62.9; 264/65; 264/234; 264/345
[58] Field of Search .................. 264/65, 61, 345, 346, 264/234, 66, 85; 252/62.9

[56] References Cited

U.S. PATENT DOCUMENTS

| 3,591,668 | 7/1971 | Kirchner et al. | 264/346 |
| 3,655,841 | 4/1972 | Akashi et al. | 264/345 |
| 3,956,150 | 5/1976 | Ouchi et al. | 252/62.9 |
| 3,963,631 | 6/1976 | Ouchi et al. | 252/62.9 |

*Primary Examiner*—Robert F. White
*Assistant Examiner*—John A. Parrish
*Attorney, Agent, or Firm*—R. S. Sciascia; Philip Schneider; Thomas McDonnell

[57] ABSTRACT

A method for strengthening lead zirconate-lead titanate ceramic transducers which comprises heating the transducer at a temperature from 900° C to 1000° C in a nonreducing atmosphere containing at least 20 volume percent of oxygen for at least one hour.

5 Claims, No Drawings

METHOD FOR STRENGTHENING PZT TRANSDUCERS

BACKGROUND OF THE INVENTION

The present invention relates generally to manufacturing ceramic transducers and in particular to a technique for reducing mechanical failure and improving uniformity of lead zirconate-lead titanate (PZT) ceramic transducers.

A primary application for these transducers is in sonar and as a result these transducers experience fluctuating compressive pressures up to 20,000 psi under average conditions and up to 30,000 psi tensile stress under shock conditions. Presently the hoop tensile strength of PZT ceramic transducers vary 2000-5000 psi so that a quantity of these transducers may physically fail after a short time of use. Another major difficulty with the use of these ceramics is the lack of stability of electro-elastic properties with time and electric field. Consequently PZT transducers require replacement after approximately 1-3 years.

Previous attempts at producing a transducer material with greater and more uniform physical strength adversely affected the small signal dielectric and piezoelectric properties and the high field dielectric properties. However, these previous attempts generally entailed changing the composition of the transducer.

SUMMARY OF THE INVENTION

It is therefore an object of this invention to provide a cheap and simple method for strengthening PZT transducers.

Another object is to provide a method of improving the uniformity of PZT transducers.

And another object of this invention is to increase the life span and strength of PZT transducer without adversely affecting piezoelectric or electro-elastic properties.

These and other objects are achieved by heating a PZT ceramic transducer at a temperature from about 900° C. to about 1000° C. in an atmosphere comprising at least 20% oxygen for at least one hour.

DETAILED DESCRIPTION OF THE INVENTION

In the practice of this invention, a PZT transducer is placed in an atmosphere which is nonreducing, is inert to the PZT material, and contains at least 20 volume percent of oxygen. Two of the most common suitable atmospheres are air and oxygen. Mixtures of argon or helium with oxygen are additional examples. The temperature of the atmosphere is from about 900° C. to about 1000° C. and preferably from 950° C. to 1000° C. The atmosphere may optionally be pressurized.

A heating time of at least one hour is necessary to give an appreciable improvement, i.e., a tensile strength increase of at least 5%. Generally, a heating time of 4 hours produces tensile strength improvements of 15 to 20 percent. In most PZT transducers currently being used, this amounts to 70 to 80 percent of the total possible improvement. Improvements up to 150 percent are possible in the newer stable PZT transducer elements containing chromic acid.

The method of this invention is applicable to any lead zirconate-lead titanate ceramic transducer. Thus PZT transducers with any Zr:Ti ratio and with any amount or type of additive are improved by the present invention. The most common Zr:Ti ratios vary from 55:45 to 51:49 and additives often comprise up to 10 mole percent of the total transducers composition. Exampliary of these additives are strontium, chromium, manganese, iron, nickel, and calcium. These additives are ordinarily introduced into the ceramic composition by compounding lead zirconate and lead titanate with the oxide of the additives. The grain structure generally varies from about $2\mu$ to about $15\mu$.

To demonstrate the effect of the method of the present invention the following examples are given in Table I. Sample I has a Zr:Ti ratio of 51-49 and the following additives: 6 at. % of $SrO_2$, 0.015 at. % of $Cr_2O_3$, and 0.005 at. % of $M_nO$. Sample II also has a Zr:Ti ratio of 51:49 but with different additives. Samples III to V have a Zr:Ti ratio of 52:48 with the following additives: 5 at. % CaO, 1 at. % MnO, 2 at. % $Cr_2O_3$, and 1 at. % $Fe_2O_3$. These three samples differ from each other in that each came from a different source. All of the samples were manufactured by sintering or hot pressing and machining. The specific heat treating method used comprised heating all of the samples in air at 1000° C. for 20 hours at atmospheric pressures.

A tensile strength of the rings was measured on equipment disclosed in Mayer, G. and Cini, H. *NVSC Technical Memorandum EB*11-29-71. The flexure strength of the materials was tested by the standard 3-point technique. Bars for the 3-point flexure measurements were cut from broken rings and from discs.

TABLE I

Average Strength (kpsi) of Lead Zirconate-Titanate Ceramics before and after Heat Treatment

| Hoop Tensile Strength | | Flexure Strength | |
|---|---|---|---|
| As received | Heat Treated | As received | Heat Treated |
| 6.2 (10) | 9.0 (6) | 10.8 (6) | 15.0 (6) |
| [4.4–8.1] | [7.9–9.7] | [10.0–11.4] | (14.0–16.9) |
| 8.7 (5) | 11.1 (5) | 17.0 (26) | 19.3 (7) |
| [7.2–10.0] | [9.2–11.9] | [14.2–18.8] | (17.8–20.9) |
| 3.1 (12) | 8.1 (6) | 6.2 (6) | 13.5 (6) |
| [1.9–4.1] | [7.1–9.4] | [5.3–7.8] | (12.3–15.1) |
| | | 10.9 (8) | 19.1 (7) |
| | | [8.9–12.2] | (17.1–21.0) |
| | | 11.4 (5) | 17.3 (4) |
| | | [10.8–11.8] | [16.1–19.1] |

() = number of samples
[] = range of results

As shown in Table I, the heat treatment method of this invention substantially increased the strength and uniformity of the transducer materials. It was also found that the fracture mode changed from completely intergranular or mixed fracture modes through out in the non-treated specimens to transgranular in a surface layer whose depth varied from $50\mu$ to 1.4mm in the heat treated specimens. Some of the heat-treated specimens (primarily those with chromium oxide additives) had a 100% intergranular fracture in the interior layers. This change in the type of fracture in the outer layer indicates that the increase in strength comes from the increase in the strength of the grain boundaries in the surface layer. The electro-elastic properties were not adversely effected.

Table II shows the increase in the modulus of rupture with time for three of the materials used in Table I. All samples were heated at 1000° C. in air.

TABLE II

| Sample | MOR $\times 10^3$ psi | Increase $\times 10^3$ psi at | | |
|---|---|---|---|---|
| | | 1 hr. | 4 hr. | 20 hr. |
| A | 17.0 (26) | 1.5 (6) | 2.0 (3) | 2.3 (7) |

TABLE II-continued

| Sample | MOR × 10³psi | Increase × 10³psi at 1 hr. | 4 hr. | 20 hr. |
|---|---|---|---|---|
| B | [14.2–18.8]<br>11.8 (14) | 2.5 (3) | 0.9 (3) | 0.7 (13) |
| C | [9.4–13.3]<br>10.8 (6)<br>[10.5–11.3] | 2.0 (4) | 1.6 (3) | 2.1 (6) |

() = number of samples
[] = range of results

From the results given in Table II, it is determined that the most rapid increase is obtained in the first 4 hours. Generally 70 to 80% of the total increase is obtained during the first four hours.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. A method of strengthening lead zirconate-lead titanate ceramic transducers which comprises heating said transducer in a nonreducing inert atmosphere containing at least 20 volume percent of oxygen at a temperature from about 900° C. to about 1000° C. for at least 1 hour.

2. The method of claim 1, wherein the temperature is from 950° C. to 1000° C.

3. A method of strengthening lead zirconate-leat titanate, ceramic transducers which comprises heating said transducer in a nonreducing inert atmosphere containing at least 20 volume percent of oxygen at a temperature from 950° C. to 1000° C. for at least 4 hours.

4. The method of claim 3, wherein the atmosphere is selected from the group consisting of air and oxygen.

5. The method of claim 4, wherein the temperature is 1000° C., the time is from 4 to 20 hours, and the atmosphere is air.

* * * * *